US006998748B2

(12) United States Patent
Yeh et al.

(10) Patent No.: US 6,998,748 B2
(45) Date of Patent: Feb. 14, 2006

(54) MOTOR ROTOR AND MANUFACTURING METHOD THEREOF

(75) Inventors: Dung-chang Yeh, Tainan (TW); Yung-ping Lin, Taoyuan (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 10/612,846

(22) Filed: Jul. 3, 2003

(65) Prior Publication Data

US 2004/0212265 A1    Oct. 28, 2004

(30) Foreign Application Priority Data

Mar. 25, 2003    (TW) .............................. 92106564 A

(51) Int. Cl.
    *H02K 21/12*    (2006.01)

(52) U.S. Cl. ........................... 310/156.12; 310/156.14; 310/156.21; 310/156.26

(58) Field of Classification Search ........... 310/156.12, 310/156.13, 156.14, 156.21, 156.23, 156.26 TO, 310/156.29, 156.31, 156.46, 154.08, 154.09, 310/154.12

See application file for complete search history.

(56) References Cited

U.S. PATENT DOCUMENTS

| | | | | |
|---|---|---|---|---|
| 3,810,056 A | * | 5/1974 | Jereb | 335/302 |
| 4,155,021 A | * | 5/1979 | Corbach et al. | 310/154.08 |
| 4,423,345 A | * | 12/1983 | Nilsson | 310/153 |
| 5,345,130 A | * | 9/1994 | Kliman et al. | 310/156.13 |
| 5,383,265 A | * | 1/1995 | Nishizawa | 29/598 |
| 5,500,994 A | * | 3/1996 | Itaya | 29/598 |
| 5,753,991 A | * | 5/1998 | Couture et al. | 310/156.46 |
| 5,777,415 A | * | 7/1998 | Suzuki et al. | 310/156.05 |
| 5,783,880 A | * | 7/1998 | Teshima et al. | 310/67 R |
| 6,140,736 A | * | 10/2000 | Hsu | 310/261 |
| 6,172,439 B1 | * | 1/2001 | Ishizuka | 310/156.27 |
| 6,362,551 B1 | * | 3/2002 | Horng | 310/156.21 |
| 6,657,328 B1 | * | 12/2003 | Shiga et al. | 310/26 |

* cited by examiner

*Primary Examiner*—Dang Le
(74) *Attorney, Agent, or Firm*—Martine Penilla & Gencarella, LLP

(57) ABSTRACT

A motor rotor includes a magnetic yoke and a rubber magnet located within the magnetic yoke. At least one pattern is formed on a surface of the rubber magnet, which faces the magnetic yoke. The manufacturing method of the motor rotor is to provide a rubber magnet having flat surfaces, and at least one pattern is formed on a surface of the rubber magnet. The rubber magnet is curved to correspond with the inner surface of the magnetic yoke by the way that the patterned surface of the rubber magnet faces outside. The rubber magnet is put inside the magnetic yoke.

9 Claims, 6 Drawing Sheets

MOTOR ROTOR AND MANUFACTURING METHOD THEREOF

BACKGROUND OF THE INVENTION

1. Field of the Invention

The invention relates to a motor rotor and its manufacturing method, and more particularly to a motor rotor having a rubber magnet with a pattern formed on the outer surface thereof for improving the flexibility of the rubber magnet of the motor rotor.

2. Description of the Related Art

A magnet is one of the essential components of a rotary machine, such as a motor. To reduce cost, cheap rubber magnets are used in conventional rotary machine structures.

The schematic structure of a conventional motor rotor adopting rubber magnets is illustrated in FIG. 1. As shown in FIG. 1, the band-shaped rubber magnet 100 with a predetermined dimension is bent into a ring in the manufacturing process of a motor adopting a rubber magnet 100. Then, the ring-shaped rubber magnet 100 is pressed into a magnetic yoke 102 to complete the assembly of a motor rotor 104.

However, in the process mentioned above, the rubber magnet 100 is not so flexible that the two end surfaces of the rubber magnet 100 cannot be jointed perfectly after the rubber magnet 100 is bent. This phenomenon becomes more significant as the thickness of the rubber magnet 100 increases. When the above phenomenon takes place, the motor suffers from the non-uniform distribution of the magnetic field or magnetic leakage, which results in the flutter of the motor. When this happens, not only the operation efficiency of the motor is reduced, but also high frequency noises are generated when the motor operates at high a speed.

SUMMARY OF THE INVENTION

In view of the above, an objective of the invention is to provide a motor rotor and the manufacturing method thereof for improving the flexibility of the rubber magnet to make the joint in the bent rubber magnet smoother and also improving the uniformity of the distribution of the magnet field to prevent fluttering and high frequency noises during motor operation and also to prevent low operation efficiency of the motor.

To achieve the above-mentioned objective, the invention provides a motor rotor including a magnetic yoke and a rubber magnet provided in the magnetic yoke in which a first surface of the rubber magnet facing the magnetic yoke has at least one first pattern. The first surface may be the outer surface of the rubber magnet.

Since patterns are formed on the outer surface of the rubber magnet, the flexibility of the rubber magnet is significantly improved and further the flatness of the joint in the rubber magnet is improved. Therefore, the mass distribution of the rubber magnet becomes more uniform and the rotational unbalance is reduced. Furthermore, due to better uniformity of the mass distribution, it is possible to improve the magnetic flux distribution of the rubber magnet after magnetizing.

Furthermore, an adhesive layer may be provided between the rubber magnet and the magnetic yoke. Since the outer surface of the rubber magnet is formed with patterns, the adhesive layer can increase the contact area to improve the adhesive strength between the rubber magnet and the magnetic yoke.

Moreover, in the motor rotor of the invention, besides formed on the first surface, patterns may be formed also on a second surface that is opposite to the first surface to further improve the flexibility of the rubber magnet.

The invention also provides a method of manufacturing a motor rotor in which a rubber magnet with a smooth surface is selected and at least one first pattern is formed on a first surface of the rubber magnet. Then, the rubber magnet is bent into a shape corresponding to an inner surface of a magnetic yoke by keeping the first surface facing outside, and is then put inside the magnetic yoke. The first surface is the outer surface of the rubber magnet.

In the method of manufacturing a motor rotor of the invention, since the outer surface of the rubber magnet is formed with patterns, the bending moment required can be reduced and the flexibility of the rubber magnet can be significantly improved.

Furthermore, an adhesive layer may be provided between the rubber magnet and the magnetic yoke. Since the outer surface of the rubber magnet is formed with patterns, the adhesive layer can increase the contact area so as to improve the adhesive strength between the rubber magnet and the magnetic yoke.

Moreover, in the method of manufacturing a motor rotor of the invention, patterns may be formed also on a second surface that is opposite to the first surface besides formed on the first surface to further improve the flexibility of the rubber magnet.

DETAILED DESCRIPTION OF THE PREFERRED EMBODIMENTS

Figure 1:
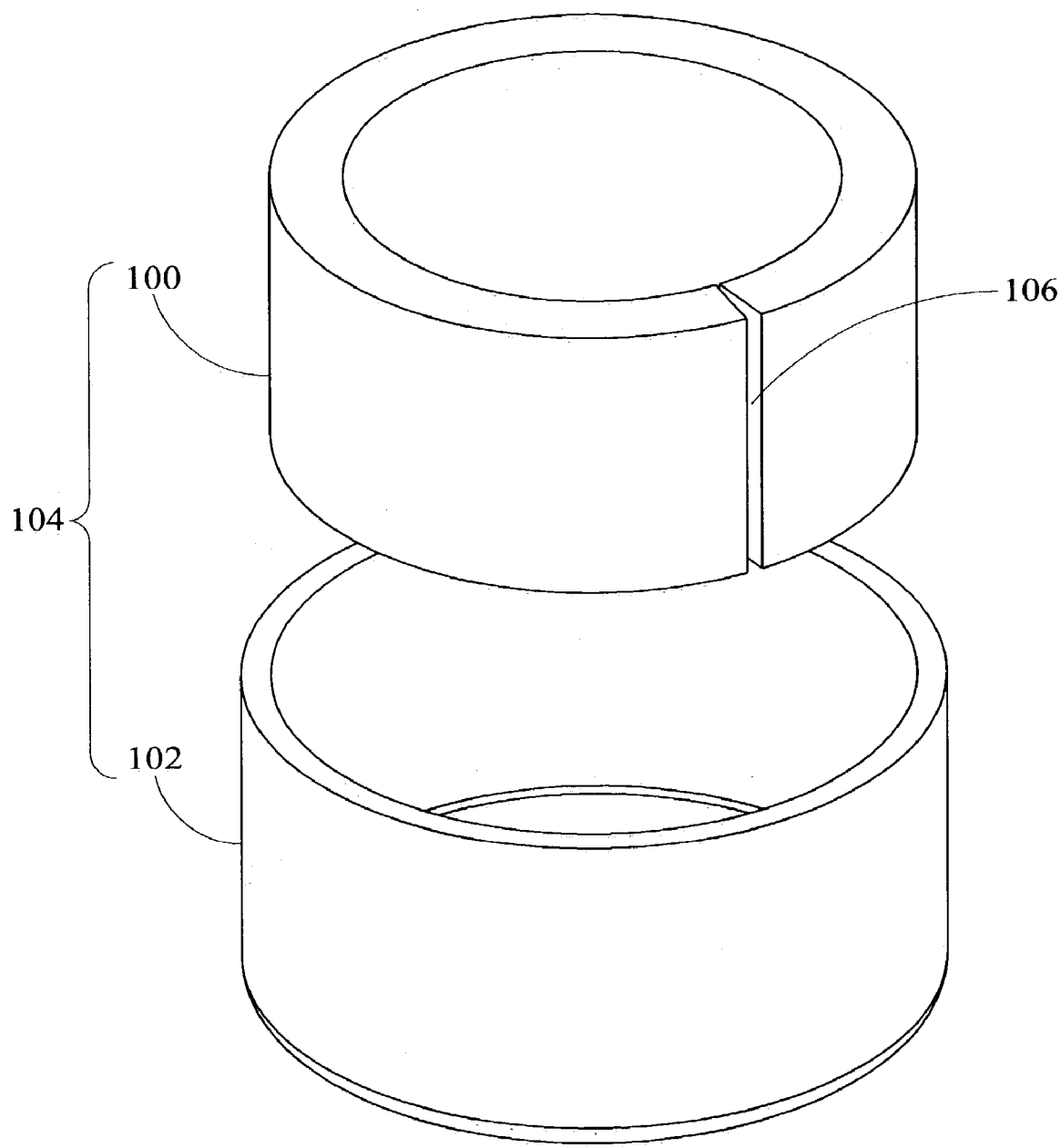
FIG. 1 is a schematic diagram showing the structure of a motor rotor in the prior art.
Figure 2A:
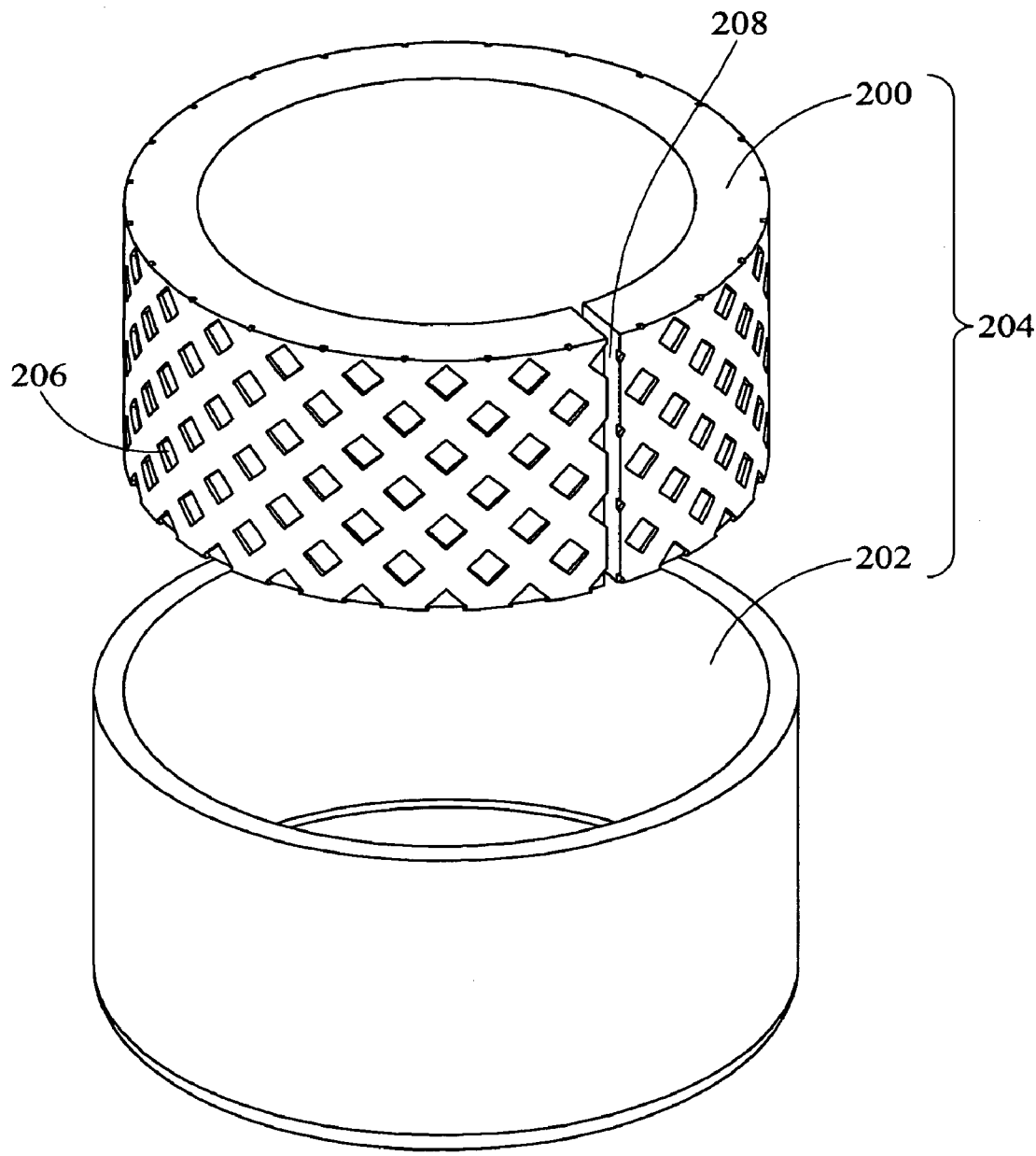
FIG. 2A is a schematic diagram showing the structure of a motor rotor according to an embodiment of the invention.

FIG. 2A is a schematic diagram showing the structure of the motor rotor according to an embodiment of the invention. As shown in FIG 2A, the motor rotor 204 includes a magnetic yoke 202 and a rubber magnet 200 provided inside the magnetic yoke 202. The magnetic yoke 202 with a shape, for example a ring shape, is made of conductive material such as metal. In the fabrication of the motor rotor 204, at first, a strip of the rubber magnet 200 made of magnetic rubber material with a smooth surface is selected. Then, one or more patterns 206 are formed on a first surface of the rubber magnet 200 that faces the magnetic yoke 202. The first surface is the outer surface of the rubber magnet. The patterns 206 can be formed and distributed uniformly or fragmentarily on the whole surface or on portions of the surface. Moreover, the patterns 206 may be formed by various methods, such as press molding.

Figure 3A:
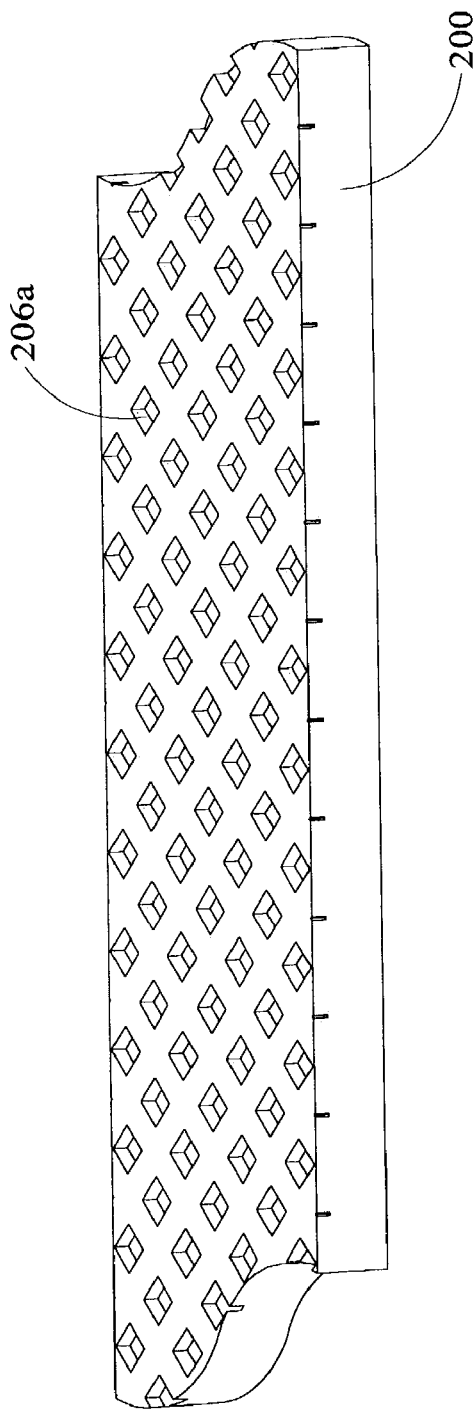
FIG. 3A is a schematic diagram showing a part of the pattern of the surface of the rubber magnet according to the embodiment of the invention.
Figure 3B:
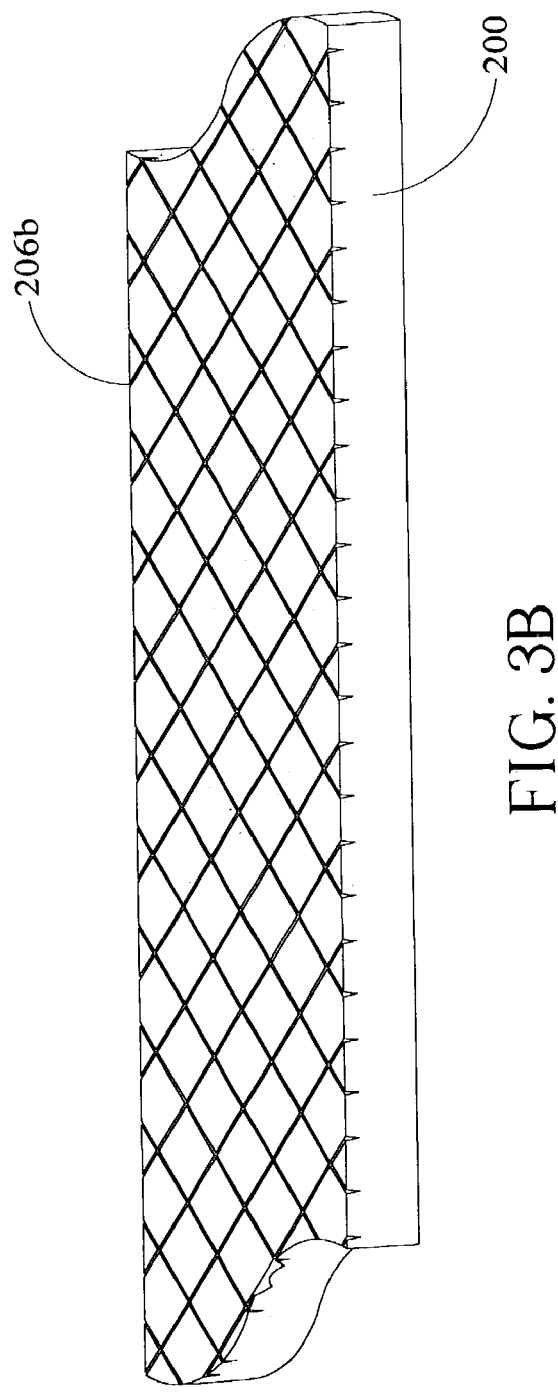
FIG. 3B is a schematic diagram showing a part of the pattern of the surface of the rubber magnet according to another embodiment of the invention.

It should be noted that the patterns 206 may be embossing patterns 206a shown in FIG. 3A, notch patterns 206b shown in FIG. 3B, or any other patterns. The shape of the rubber magnet 200 is fit with the shape of the inner surface of the magnetic yoke 202, such as a ring shape. Furthermore, the patterns 206 can be formed at the same time the rubber magnet 200 is made. This can reduce the number of steps for preparing the rubber magnet 200.

The rubber magnet 200 is then bent into the shape corresponding to the inner surface of the magnetic yoke 202 by keeping its patterned surface facing outside. At this time, the joint 208 of the two ends of the rubber magnet 200 have improved flatness and fitness. Subsequently, the bent rubber magnet 200 is placed into the magnetic yoke 202. Finally, the rubber magnet 200 is magnetized to complete the fabrication of the motor rotor 204.

Figure 4B:
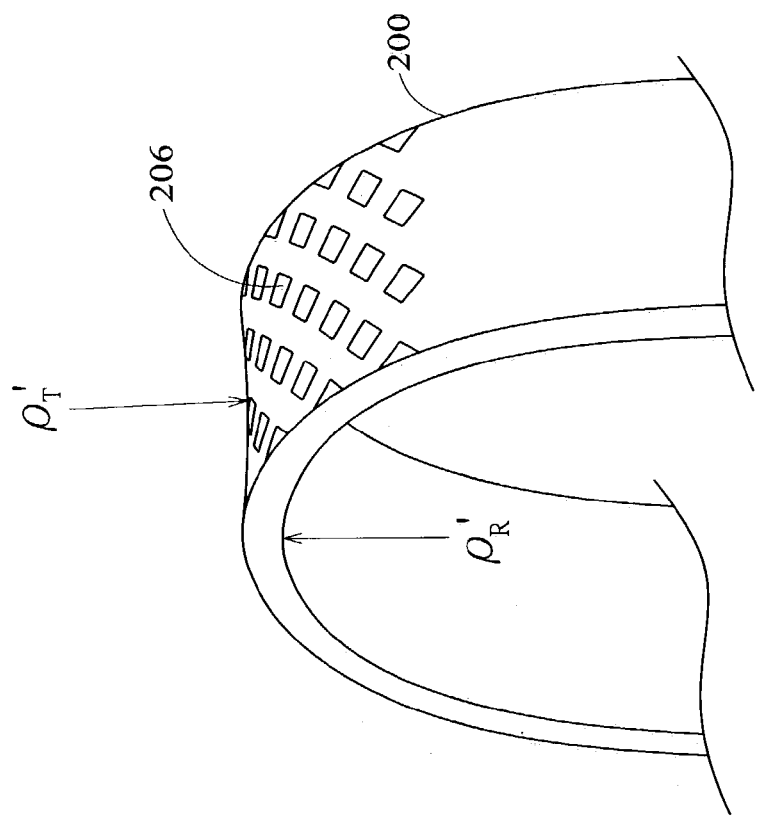
FIG. 4B is a schematic diagram showing a part of a rubber magnet according to an embodiment of the invention.
Figure 4A:
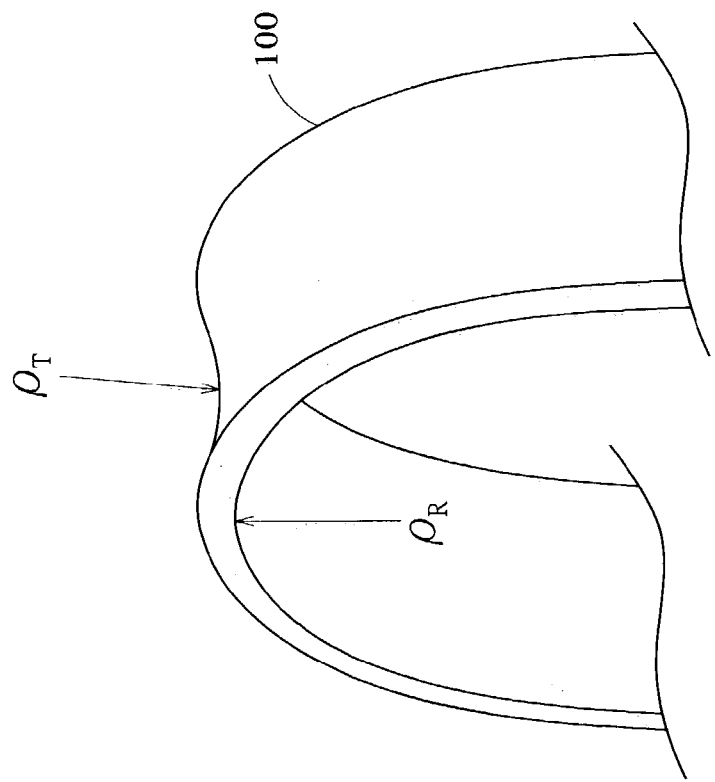
FIG. 4A is a schematic diagram showing a part of a rubber magnet in the prior art.

Since the outer surface of the rubber magnet 200 is formed with patterns 206, the flexibility of the rubber magnet 200 is significantly improved that can be illustrated by FIGS. 4A and 4B. FIG. 4A is a schematic diagram showing a part of a prior-art rubber magnet 100 and FIG. 4B is a schematic diagram showing a part of the rubber magnet according to the preferred embodiment of the invention. As shown in FIGS. 4A and 4B, when the rubber magnets 100 and 200 are bent to have the same radius (that is, $\rho_R=\rho'_R$), the surface of the magnetic rubber 100 would be dented inwardly (that is, the curvature radius $\rho_T$ is smaller). On the other hand, the surface of the magnet rubber 200 has no significant change (that is, the curvature radius $\rho'_T$ is smaller). It is shown that the magnet rubber 200 has a better flatness than the rubber magnet 100.

Furthermore, in another embodiment, patterns can be formed also on the inner surface (opposite to the outer surface mentioned previously) of the rubber magnet 200. The patterns formed on the inner surface of the rubber magnet can be embossing patterns, notch patterns or any other patterns. Thus, the flexibility of the rubber magnet 200 can be further improved. The patterns formed on the inner surface and the outer surface can be the same or different.

Figure 5:
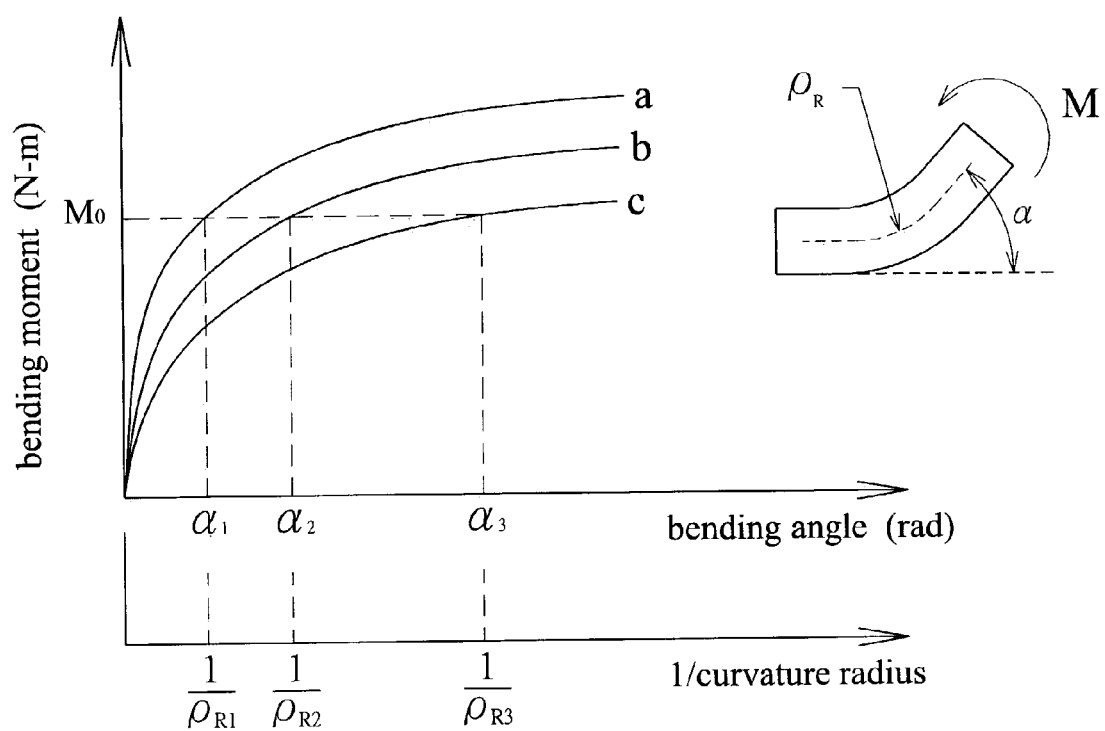
FIG. 5 is a graph showing the relationships between the bending moment and the curvature radius of different rubber magnets.

Using the conventional bending moment-bending angle measurement method, the results of the bending moment-bending angle tests of the prior-art rubber magnet, the rubber magnet of the first embodiment, and the rubber magnet of the second embodiment of the invention are shown in FIG. 5. In FIG. 5, the bending characteristics of the prior-art rubber magnet 100, the rubber magnet 200 of the first embodiment, and the rubber magnet 200 of the second embodiment are represented by curve a, b, and c, respectively. When the bending moment is set to M0, the bending angles of the prior-art rubber magnet 100, the rubber magnet 200 of the first embodiment and the rubber magnet 200 of the second embodiment are $\alpha 1$, $\alpha 2$ and $\alpha 3$, respectively. As shown in FIG. 5, the relationships of the bending angles are $\alpha 1 < \alpha 2 < \alpha 3$, and the relationships of the curvature radiuses are $\rho_{R1} > \rho_{R2} > \rho_{R3}$. The result shows that the flexibility of the rubber magnet 200 of the second embodiment is better than that of the rubber magnet 200 of the first embodiment, and the flexibility of the rubber magnet 200 of the first embodiment is better than that of the prior-art rubber magnet 100.

Furthermore, an adhesive layer (not shown in the figures) may be provided between the rubber magnet 200 and the magnetic yoke 202 to avoid the unfavorable conditions between the rubber magnet 200 and the magnetic yoke 202, such as looseness and clearances, and to enhance their adhesive strength. The adhesive layer may be made of an adhesive or materials including adhesives. Since the outer surface of the rubber magnet 200 (that is, the surface contacts with the magnetic yoke 202) is formed with the patterns 206, the adhesive layer can be provided at the dents or protrusions of the patterns 206 to increase the contact area of the adhesive layer and to improve the adhesive strength between the rubber magnet 200 and the magnetic yoke 202.

Since the outer surface of the rubber magnet is formed with patterns, the flexibility of the rubber magnet can be significantly improved. Therefore, the mass distribution of the rubber magnet would be more uniform, and the rotational unbalance would be reduced. Furthermore, due to better uniformity of the mass distribution, it is possible to improve the magnetic flux distribution of the rubber magnet after magnetizing.

Figure 2B:
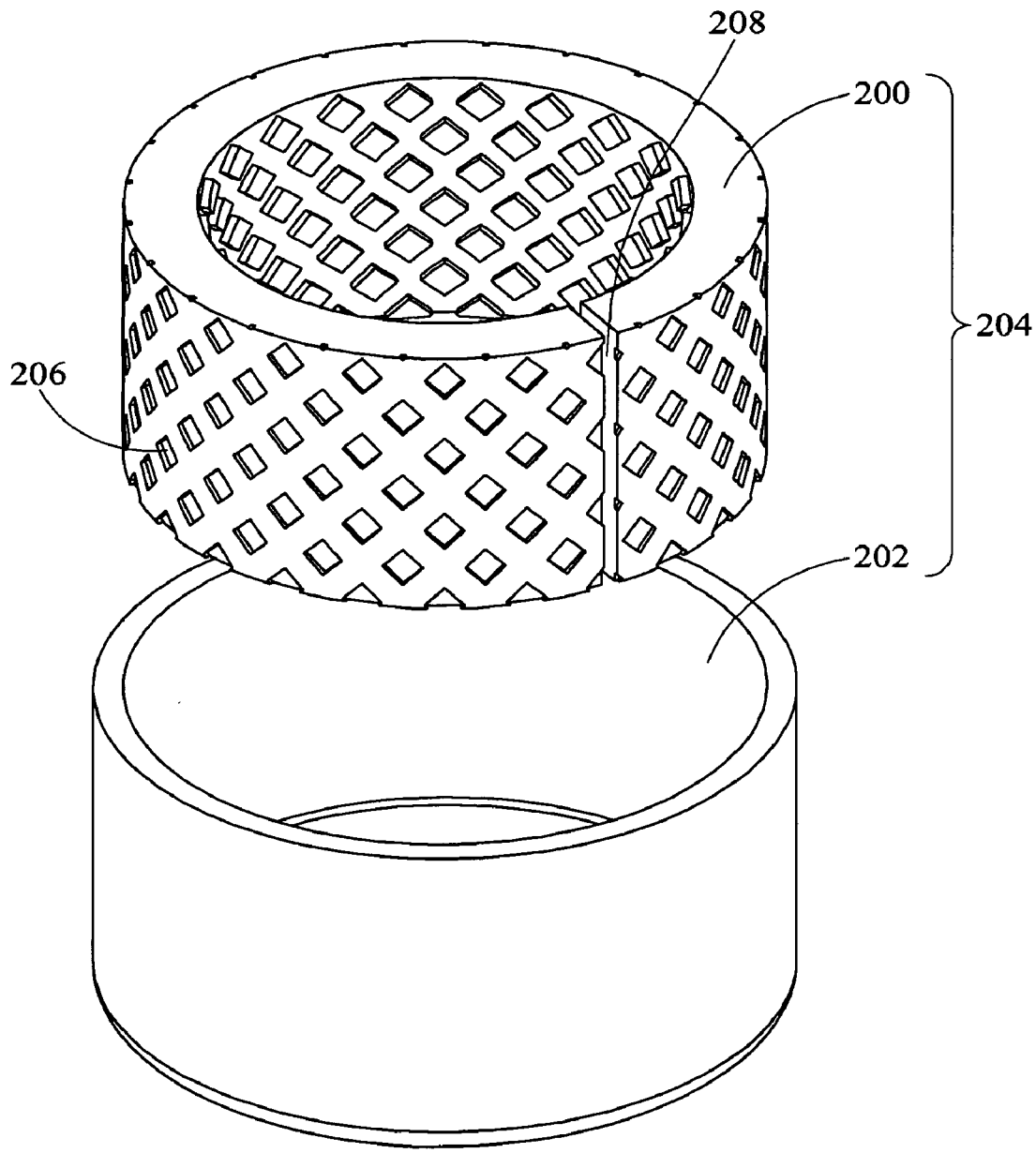
FIG. 2B is a schematic diagram showing the patterns of the surfaces of the rubber magnet according to another embodiment of the invention.

Moreover, patterns can be formed both on the first surface of the rubber magnet that contacts with the magnetic yoke and on a second surface opposite to the first surface to further improve the flexibility of the rubber magnet, as shown in FIG. 2B. The patterns formed on the first or second surface of the rubber magnet can be a notch or embossing pattern.

While the invention has been described by way of examples and in terms of embodiments, it is to be understood that the invention is not limited to the disclosed embodiments, and is intended to cover various modifications. Therefore, the scope of the appended claims should be accorded the broadest interpretation so as to encompass all such modifications.

What is claimed is:

1. A motor rotor, comprising:
   a magnetic yoke having a ring shape and an inner surface; and
   a rubber magnet in the form of a strip having two ends, the strip being defined into a ring shape where the two ends of the rubber magnet are aligned with one another, and the ring shape of the rubber magnet being configured to fit within the inner surface of the magnetic yoke, and a first surface of the rubber magnet facing the inner surface of the magnetic yoke, the first surface having at least one first pattern for increasing a flexibility of the rubber magnet, the at least one first pattern enabling the two ends of the strip that defines the rubber magnet to join so as to define the ring shape of the rubber magnet.

2. A motor rotor according to claim 1, further comprising:
   an adhesive layer provided between the rubber magnet and the magnetic yoke.

3. A motor rotor according to claim 1, wherein the first pattern includes a notch pattern.

4. A motor rotor according to claim 1, wherein the first pattern includes an embossing pattern.

5. A motor rotor according to claim 1, wherein the rubber magnet further comprises a second surface opposite to the first surface having at least one second pattern.

6. A motor rotor according to claim 5, wherein the second pattern includes a notch pattern.

7. A motor rotor according to claim 5, wherein the second pattern includes an embossing pattern.

8. A motor rotor, comprising:
   a magnetic yoke having a ring shape and an inner surface; and
   a rubber magnet in the form of a strip having two ends, the strip being defined into a ring shape where the two ends of the rubber magnet are aligned with one another, and the ring shape of the rubber magnet being configured to fit within the inner surface of the magnetic yoke, and a first surface of the rubber magnet facing the inner surface of the magnetic yoke, the first surface having at least one first pattern, the at least one first pattern enabling the two ends of the strip that defines the rubber magnet to join so as to define the ring shape of the rubber magnet, and a second surface of the rubber magnet opposite to the first surface having at least one second pattern, wherein the at least one second pattern includes a notch pattern.

9. A motor rotor, comprising:

a magnetic yoke having a ring shape and an inner surface; and a rubber magnet in the form of a strip having two ends, the strip being defined into a ring shape where the two ends of the rubber magnet are aligned with one another, and the ring shape of the rubber magnet being configured to fit within the inner surface of the magnetic yoke, and a first surface of the rubber magnet facing the inner surface of the magnetic yoke, the first surface having at least one first pattern, the at least one first pattern enabling the two ends of the strip that defines the rubber magnet to join so as to define the ring shape of the rubber magnet, and a second surface of the rubber magnet opposite to the first surface having at least one second pattern, wherein the at least one second pattern includes an embossing pattern.

* * * * *